(12) United States Patent
Tsukui et al.

(10) Patent No.: US 9,577,418 B2
(45) Date of Patent: Feb. 21, 2017

(54) CABLE SYSTEM

(71) Applicant: Topy Kogyo Kabushiki Kaisha, Tokyo (JP)

(72) Inventors: Shingo Tsukui, Tokyo (JP); Seiji Oomura, Tokyo (JP); Hidekazu Iwaki, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 271 days.

(21) Appl. No.: 14/369,021

(22) PCT Filed: Dec. 26, 2012

(86) PCT No.: PCT/JP2012/083585
§ 371 (c)(1),
(2) Date: Jun. 26, 2014

(87) PCT Pub. No.: WO2013/099912
PCT Pub. Date: Jul. 4, 2013

(65) Prior Publication Data
US 2015/0028146 A1  Jan. 29, 2015

(30) Foreign Application Priority Data
Dec. 27, 2011 (JP) ................ 2011-286004

(51) Int. Cl.
*H02G 11/02* (2006.01)
*B65H 75/42* (2006.01)
*B65H 75/44* (2006.01)

(52) U.S. Cl.
CPC .......... *H02G 11/02* (2013.01); *B65H 75/425* (2013.01); *B65H 75/4486* (2013.01); *B65H 2701/34* (2013.01)

(58) Field of Classification Search
CPC ...... H02G 11/00; H02G 11/006; H02G 11/02; B65H 75/00; B65H 75/38; B65H 75/40; B65H 79/00
See application file for complete search history.

(56) References Cited

FOREIGN PATENT DOCUMENTS

| JP | S58-188255 A | 11/1983 |
|---|---|---|
| JP | 2006-23287 A | 1/2006 |

(Continued)

OTHER PUBLICATIONS

International Search Report for corresponding International Application No. PCT/JP2012/083585, mailed Feb. 5, 2013 (2 pages).

(Continued)

*Primary Examiner* — R. J. McCarry, Jr.
(74) *Attorney, Agent, or Firm* — Osha Liang LLP

(57) ABSTRACT

A cable system has a cable connecting a base device and a travelling body, functions of the cable at least including transmission of signals, a reel device disposed on the travelling body, the reel device having a reel onto which the cable is to be wound, a motor that drives the reel and a rotation sensor that detects a rotation of the reel, a motor controller that controls the motor of the reel device; and an acceleration sensor that is disposed in the traveling body and detects an acceleration in a vertical direction, the motor controller basically opening a motor drive circuit for driving the motor or bringing a supply current to the motor to zero when it is determined that the reel is rotated in an unreeling direction for unreeling the cable based on sensed information from the rotation sensor.

4 Claims, 8 Drawing Sheets

(56) References Cited

FOREIGN PATENT DOCUMENTS

| | | | | |
|---|---|---|---|---|
| JP | 2008-254927 | * 10/2008 | ............. | B65H 75/38 |
| JP | 2008-254927 A | 10/2008 | | |
| JP | 2008-278644 A | 11/2008 | | |

OTHER PUBLICATIONS

Notice of Reasons for Rejection for corresponding Japanese Application No. 2013-510428, mailed Apr. 23, 2013 (8 pages).
Final Decision of Rejection for corresponding Japanese Application No. 2013-510428, mailed Sep. 3, 2013 (7 pages).

* cited by examiner

CABLE SYSTEM

FIELD OF THE INVENTION

The present invention relates to a cable system including a reel device.

BACKGROUND OF THE INVENTION

It is a known art to remotely control the motion of a crawler-type travelling body by using a remote controller (base device). A crawler-type travelling body is provided with a video camera. Image signals from the video camera are transmitted to a remote controller. An operator operates the remote controller while monitoring the motion of the crawler-type travelling body with a display monitor that accompanies the remote controller. Remote control signals from the remote controller are transmitted to the crawler-type travelling body to make the crawler-type travelling body turn or move forward, backward, or otherwise.

Systems for transmitting the image signals and the remote control signals include a wireless system and a wired system. A wired system is usually adopted when a crawler-type travelling body is used in a place where radio signals are not easily received such as in a building with winding passages and under the water. In the wired system, a crawler-type travelling body and a remote controller are connected with a long cable. Signal transmission wires are included in the cable. Feeder wires as power lines may also be included in the cable as necessary.

A robot for rescue operation or exploration may work in a site inside a building. Sometimes, an operator has to control a controller at a place distanced from the site by 100 meters or more, sometimes as far as 1000 meters, due to poisons, radiation, explosion risk and other risks that prevent him from getting closer to the site. Wired crawler-type travelling bodies are predominantly adopted for such robots.

In the wired crawler-type travelling body mentioned above, a reel for winding a cable therearound may be disposed in a base station where an operator is stationed, or may be disposed in the crawler-type travelling body.

In a case where a reel is disposed in a base station, when a crawler-type travelling body heads for a site a long distance away, it is required that the crawler-type travelling body unreel a cable from the reel in the base station and move drawing the long cable. This may cause too much load to the crawler-type travelling body.

To avoid such a situation, it is appropriate to dispose a reel on a crawler-type travelling body when a base station is a long distance away from a site. In this case, a cable is unreeled as the crawler-type travelling body is moved, and therefore, the load may be limited. It is preferable that a power line that tends to be heavy is not included in the cable but only a signal transmission wire that is thin, light-weight and strong is included in the cable.

However, when a reel is disposed on a crawler-type travelling body as mentioned above, a thin and long cable may be would around the reel. This may lead to a problem that the cable may become slack and hook onto a part of the crawler-type travelling body or the cable may get tangled, becoming unable to transmit signals, and as a result, making the crawler-type travelling body immovable.

Patent Document 1 to be identified later discloses a reel device disposed on a crawler-type travelling body. The reel device includes a reel around which a cable is wound, a motor connected to the reel and a rotation sensor that detects rotation of the reel.

In Patent Document 1, the motor is controlled by a motor controller basically as follows. When the crawler-type travelling body is moved in a direction (forward) away from the remote controller (base station) and the rotation of the reel in an unreeling direction is detected by the rotation sensor, the motor is made free, allowing the cable to be smoothly unreeled from the reel device, thereby preventing the cable from becoming too tense and from providing resistance against the forward movement of the crawler-type travelling body.

When the crawler-type travelling body is moved in a direction (backward) toward the remote controller, the motor is activated to reel the cable onto the reel, thereby preventing the cable from becoming slack.

The basic control as mentioned above alone may cause inconvenience. For example, when the crawler-type travelling body is moving forward, the motor is made free and the cable is allowed to unreel. In this condition, if the crawler-type travelling body is stopped suddenly, the reel will keep rotating due to the inertia, causing the cable to be unreeled more than necessary and to become slack.

To solve this problem, Patent Document 1 discloses an acceleration sensor that detects acceleration in a front-rear direction disposed in a crawler-type travelling body. When the crawler-type travelling body is stopped suddenly while moving forward as mentioned above, the motor is activated to rotate the reel in a reeling direction to reel the cable in response to the acceleration in a backward direction detected by the acceleration sensor.

PRIOR ART DOCUMENTS

Patent Documents

Patent Document 1: Japanese Unexamined Patent Application Publication No. 2008-254927

SUMMARY OF THE INVENTION

Problem to be Solved by the Invention

There still remains a problem unsolved by the Patent Document 1. Details will be given below.

When the crawler-type travelling body completes ascending stairs, a front side of the crawler-type travelling body is suddenly moved downward due to the gravity, and an attitude of the crawler-type travelling body is suddenly changed from an inclined attitude to a horizontal attitude. Then the crawler-type travelling body strongly hits a floor surface located on top of the stairs and makes a landing (end of sudden change of attitude). Since the reel is pulled by the cable accompanying the sudden change of attitude of the crawler-type travelling body, the reel is rotated rapidly, unreeling the cable rapidly. Even after the crawler-type travelling body completes landing, the reel keeps rotating rapidly due to the inertia. This causes the cable to become slack, and the slack portion may get tangled onto the reel rotating in the unreeling direction or may spread near the reel disorderly or hook onto a part of the crawler-type travelling body, making the crawler-type travelling body immovable and preventing the crawler-type travelling body from returning.

An attempt is made in the Patent Document 1 to control the reeling of the reel by detecting a completion of ascending stairs as described above based on the acceleration information in the front-rear direction from the acceleration sensor. However, the attempt fails to bring about a satisfactory result.

Particularly when the cable is 100 meters or longer, problems similar to those described above that occurred at the completion of ascent also happened at a start of descent and at a completion of descent.

Solution to the Problem

The present invention was made to solve the problems mentioned above. The present invention provides a cable system including: a cable connecting a base device and a travelling body, functions of the cable at least including transmission of signals; a reel device disposed on the travelling body, the reel device having a reel onto which the cable is to be wound, a motor that drives the reel and a rotation sensor that detects a rotation of the reel; a motor controller that controls the motor of the reel device; and an acceleration sensor that detects an acceleration of the travelling body in a vertical direction; the motor controller basically opening a motor drive circuit for driving the motor or bringing a supply current to the motor to zero when it is determined that the reel is rotated in an unreeling direction for unreeling the cable based on sensed information from the rotation sensor; the motor controller basically activating the motor to provide the reel with a rotary torque in a reeling direction when it is determined that the reel is rotated in a reeling direction for reeling the cable based on the sensed information from the rotation sensor; and the motor controller activating the motor to provide the reel with the rotary torque in the reeling direction if an end of sudden change of attitude of the travelling body is detected based on information on acceleration in the vertical direction obtained from the acceleration sensor even when the reel is rotated in the unreeling direction.

In the cable system having the features described above, the reel can be provided with the rotary torque in the reeling direction immediately after the sudden change of attitude of the travelling body that may happen when the travelling body completes ascending, starts descending or completes descending stairs or a large step or bump. Therefore, the reel can be restrained from rotating rapidly in the unreeling direction due to the inertia. Moreover, since the direction of rotation of the reel can be reversed to the reeling direction in a short period of time, the amount of slack of the cable can be reduced, and the slack can be removed in a short period of time.

Preferably, the motor controller detects the end of sudden change of attitude of the travelling body based on a differential value of the acceleration in the vertical direction obtained from the acceleration sensor.

Since the differential value of the acceleration is used in the cable system having the features described above, responsiveness can be further enhanced.

Preferably, the motor controller judges whether a rotation speed of the reel in the unreeling direction detected by the rotation sensor exceeds a reference value or not when the end of sudden change of attitude of the travelling body is detected, and only when the judgment is positive, the motor controller activates the motor to provide the reel with the rotary torque in the reeling direction.

In the cable system having the features described above, false detection that may be made when depending on the information on the acceleration in the vertical direction only can be surely avoided. Specifically, when the travelling body receives a vibration in the vertical direction while moving an uneven surface, the travelling body can be prevented from being misjudged as completing ascent or starting descent. As a result, unnecessary provision of the rotary torque in the reeling direction to the reel that can hinder the travelling body from moving forward can be avoided.

Preferably, the reel device further includes a reel diameter detector that detects a diameter of the reel with the cable wound around the reel; and the motor controller (a) calculates an unreeling speed at which the cable is unreeled from the reel based on the diameter of the reel detected by the reel diameter detector and the rotation speed of the reel in the unreeling direction detected by the rotation sensor, and (b) judges whether the unreeling speed of the cable exceeds a reference value when the end of sudden change of attitude of the travelling body is detected, and only when the judgment is positive, the motor controller activates the motor to provide the reel with the rotary torque in the reeling direction.

In the cable system having the features described above, just like the cable system described in the previous paragraph, false detection that may be made when depending on the information on the acceleration in the vertical direction only can be surely avoided.

Preferably, the reel device further includes a reel diameter detector that detects a diameter of the reel with the cable wound around the reel; and when the reel is rotated in the unreeling direction, the motor controller (a) calculates an unreeling speed at which the cable is unreeled from the reel based on the diameter of the reel detected by the reel diameter detector and the rotation speed of the reel in the unreeling direction detected by the rotation sensor, (b) opens the motor drive circuit to minimize a resistance of the motor when the unreeling speed of the cable is smaller than a travelling speed of the travelling body, and (c) closes the motor drive circuit to restrict the rotation of the reel by the resistance of the motor when the unreeling speed of the cable is greater than the travelling speed of the travelling body.

In the cable system having the features described above, even when the reel is rotated in the unreeling direction, a cause of the slack of the cable can be removed by restricting the rotation of the reel if the unreeling speed of the cable is greater than the travelling speed of the travelling body.

Advantageous Effects of the Invention

According to the cable system of the present invention, the slack of the cable that may be generated immediately after the sudden change of attitude of the travelling body that may be made when the travelling body completes ascending, starts descending or completes descending stairs or a large step or bump can be restrained, and the slack that may be generated can be removed in a short period of time. As a result, inconvenient situations such as the slack portion spreading near the reel disorderly can be avoided.

DESCRIPTION OF THE PREFERRED EMBODIMENTS

Figure 1:
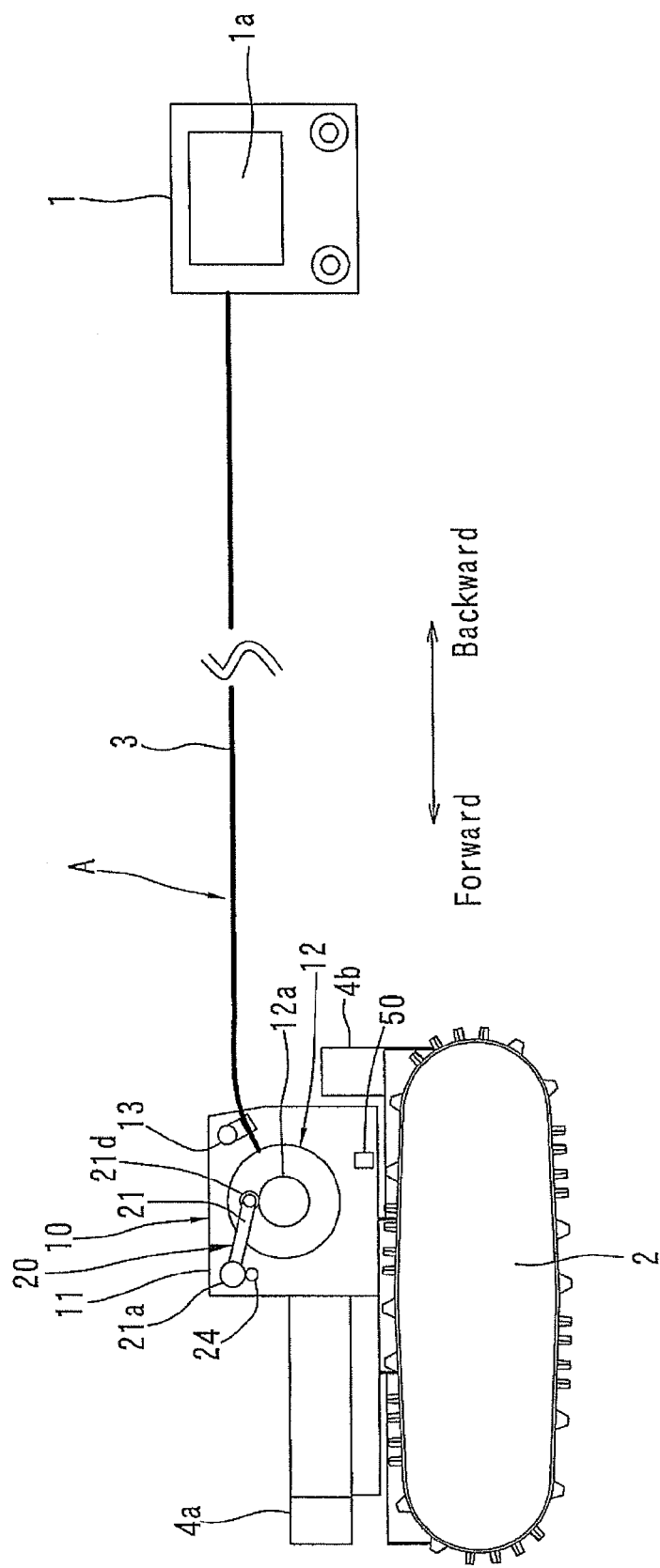
FIG. 1 is a schematic side view of an exploration system including a cable system according to an embodiment of the present invention.

An exploration system including a cable system A according to an embodiment of the present invention will be described hereinafter with reference to the drawings. As shown in FIG. 1, the exploration system includes a remote controller 1 (base device), a crawler-type travelling body 2 (travelling body) and a long cable 3 connecting the remote controller 1 and the crawler-type travelling body 2.

The remote controller 1 has a display monitor 1a. The crawler-type travelling body 2 includes a motor and a battery for moving the travelling body. The cable 3 includes optical fibers that may transit signals.

Video cameras 4a, 4b (exploration device) are disposed on the crawler-type travelling body 2. The video camera 4a takes images of the view ahead of the crawler-type travelling body 2 and the video camera 4b takes images of the view behind of the crawler-type travelling body 2. As an exploration device, in place of the video camera or in addition to the video camera, a sensor such as an infrared sensor, a chemical detection sensor, a temperature sensor or a radiation sensor may be used.

An operator remotely controls the crawler-type travelling body 2 to make the crawler-type travelling body 2 turn or move forward, backward, or otherwise, viewing images from the video camera 4a during the forward movement of the crawler-type travelling body 2 and viewing images from the video camera 4b during the backward movement of the crawler-type travelling body 2 displayed on the display monitor 1a.

The cable system A includes the cable 3 mentioned above and a reel device 10 that may reel and unreel the cable 3. The reel device 10 is disposed on a rear portion of the crawler-type travelling body 2, for example, and includes a pair of supports 11 (device bodies) fixed to a top surface of a base of the crawler-type travelling body 2, a reel 12 rotatably supported by the supports 11 and a cable moving mechanism 13. An axis of the reel 12 extends horizontally perpendicular to directions in which the crawler-type travelling body 2 moves forward and backward.

The cable moving mechanism 13 is supported by the pair of supports 11 in the vicinity of the reel 12. The cable moving mechanism 13 may move the cable 3 in an axial direction of the reel 12 accompanying a rotation of the reel 12, and when the cable 3 reaches a terminal point of a range of moving, reverse the moving direction of the cable 3, thereby making the cable 3 wound around a body 12a of the reel 12 generally evenly in a direction of an axis of the body 12a.

One end of the cable 3 is connected to a converter built in the remote controller 1. The converter converts optical signals sent from the cable 3 to the remote controller 1 into electrical signals and converts electrical signals sent from the remote controller 1 to the cable 3 into optical signals.

As mentioned above, the cable 3 is wound around the body 12a of the reel 12 via the cable moving mechanism 13 of the reel device 10. The other end of the cable 3 is connected to a rotary joint (not shown) disposed in the reel 12 and further connected to electrical signal wires of a plurality of systems via a converter and a hub.

The electrical signal wires of the plurality of systems are provided for transmitting control signals to a motor driver of the motor for moving of the crawler-type travelling body 2, transmitting image signals (exploration signals) from the video cameras 4a, 4b, etc. Conversion between optical signals and electrical signals is also performed by the converter of the reel device 10.

Figure 2:
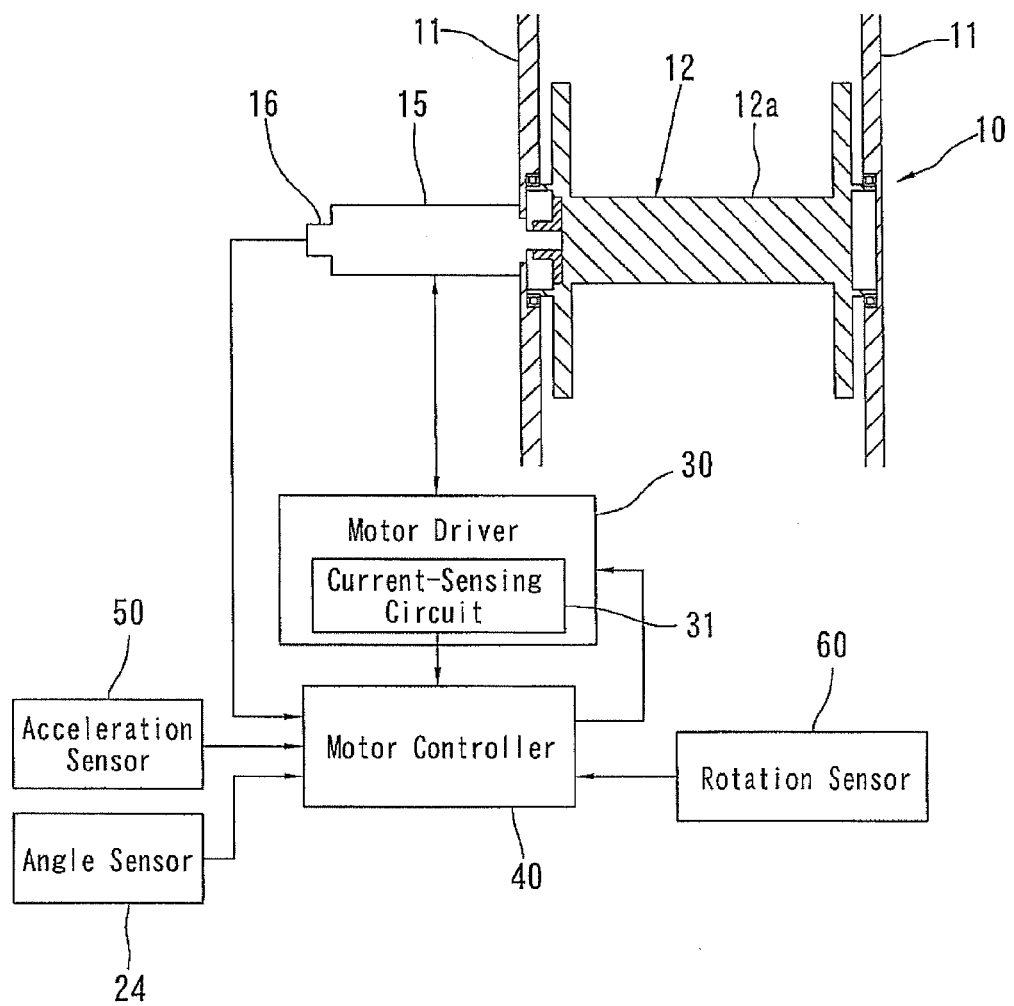
FIG. 2 is a cross-sectional plan view of a reel device of the cable system together with a block diagram showing a schema for controlling a motor of the reel device.

As shown in FIG. 2, the reel device 10 includes a motor 15 for the reel and a rotation sensor 16 such as a rotary encoder.

The motor 15 is a DC motor with brush, for example, and is fixed to a side wall of the support 11 and connected to the reel 12 via a built-in gear train.

The rotation sensor 16 detects a direction of rotation of the motor 15 (thereby, of the reel 12). Specifically, the rotation sensor 16 detects whether the motor 15 is rotated in a reeling direction or an unreeling direction. The rotation sensor 16 also detects rotation speed (number of rotations per unit time) of the motor 15.

Figure 3:
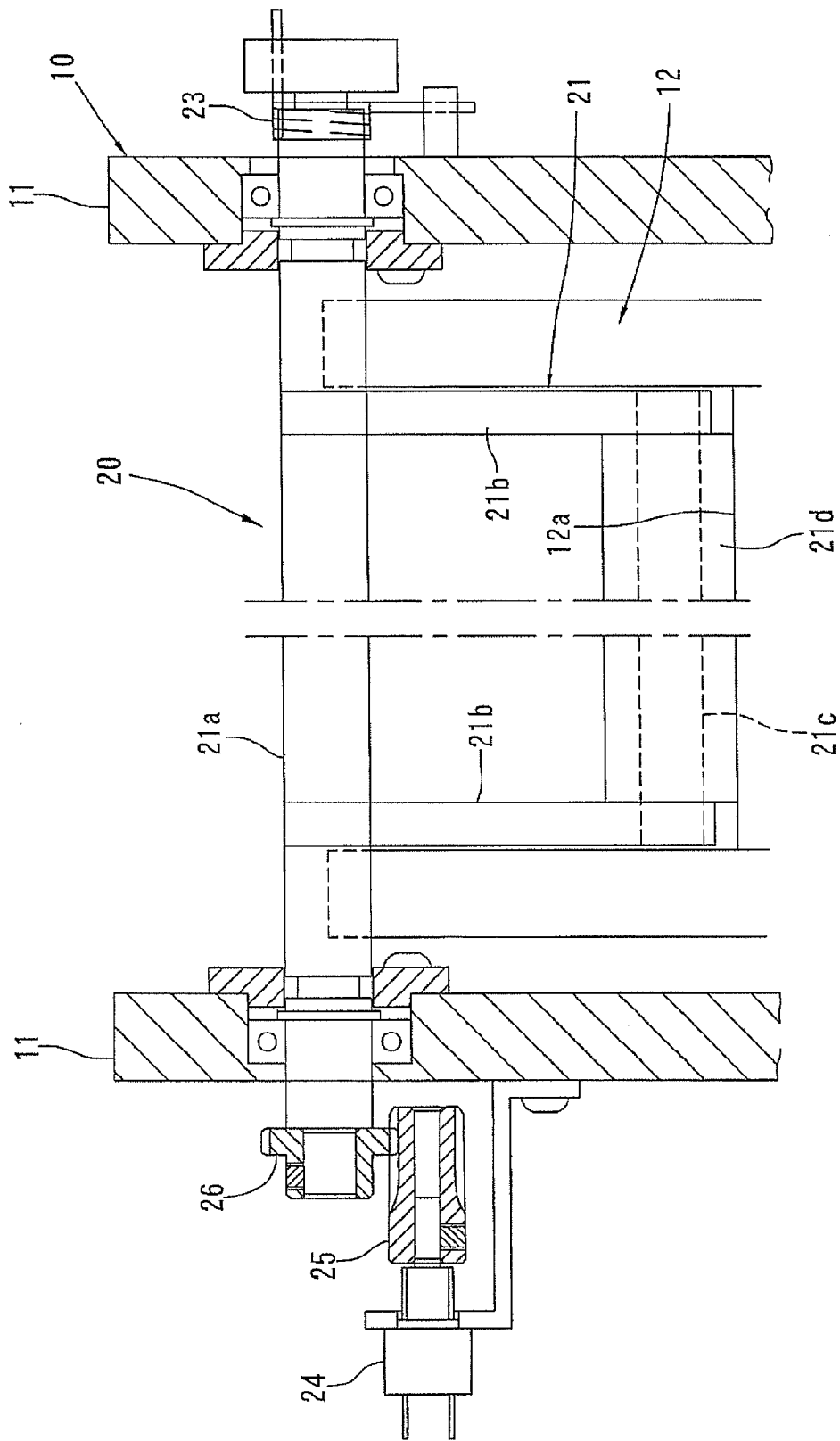
FIG. 3 is a partially cut-away front view of a reel diameter detection mechanism of the reel device.

The reel device 10 further includes a reel diameter detection mechanism 20 (reel diameter detector) shown in FIGS. 1 and 3. The detection mechanism 20 includes a contact arm 21 rotatably supported by the support 11. The contact arm 21 includes a rotary shaft 21a, a pair of left and right arm portions 21b, a support shaft 21c and a rotary roller 21d (contact portion). The rotary shaft 21a extends parallel to the axis of the reel 12. One ends of the left and right arm portions 21b are fixed to the rotary shaft 21a. The support shaft 21c is disposed between the other ends of the arm portions 21b and extends parallel to the rotary shaft 21a and the axis of the reel 12. The rotary roller 21d is rotatably supported by the support shaft 21c.

The detection mechanism 20 further includes a torsion spring 23 (biasing member) and an angle sensor 24 such as a potentiometer.

The torsion spring 23 is wound around one end portion of the rotary shaft 21a. One end of the torsion spring 23 is caught by the rotary shaft 21a. The other end of the torsion spring 23 is caught by the support 11. The rotary roller 21d of the contact arm 21 is biased downward, i.e. toward the body 12a of the reel 12, by an elastic force of the torsion spring 23. Thereby, the rotary roller 21d of the contact arm 21 is constantly in contact with a portion of the cable 3 located outside in a radial direction of the reel 12. To avoid complicated drawing, cable 3 is omitted in FIGS. 2 and 3.

The angle sensor 24 is disposed near the other end portion of the rotary shaft 21a. The angle sensor 24 is attached to the side wall of the support 11 via a bracket. The angle sensor 24 is connected to the other end portion of the rotary shaft 21a via gears 25, 26. The angle sensor 24 detects an angle of the contact arm 21. The more an amount of the cable 3 left would around the reel 12, the closer to horizontal the angle of the contact arm 21 is. Accordingly, the angle of the contact arm 21 detected by the angle sensor 24 substantially indicates an amount of the cable 3 left wound around the reel 12, and substantially indicates a diameter of the reel 12 including the cable 3 wound around the reel 12.

As shown in FIG. 2, the cable system A further includes a motor driver 30, a motor controller 40 including a microprocessor and an acceleration sensor 50.

The motor driver 30 includes a motor drive circuit that supplies drive current to the motor 15 and a current-sensing circuit 31 that detects electrical current flowing in a coil of the motor 15.

The acceleration sensor 50 is attached to the support 11, for example, and detects acceleration in at least two axes, specifically, an acceleration in a front-rear direction of the crawler-type travelling body 2 (this acceleration information is to be referred to as acceleration A hereinafter) and an acceleration in a vertical direction of the crawler-type travelling body 2 (this acceleration information is to be referred to as acceleration B hereinafter).

The motor controller 40 controls the motor 15 by sending control signals to the motor driver 30 based on sensed information from the rotation sensor 16, the angle sensor 24, the current-sensing circuit 31, the acceleration sensor 50 and a rotation sensor 60 that detects rotation of a sprocket of the crawler-type travelling body 2.

Figure 4:
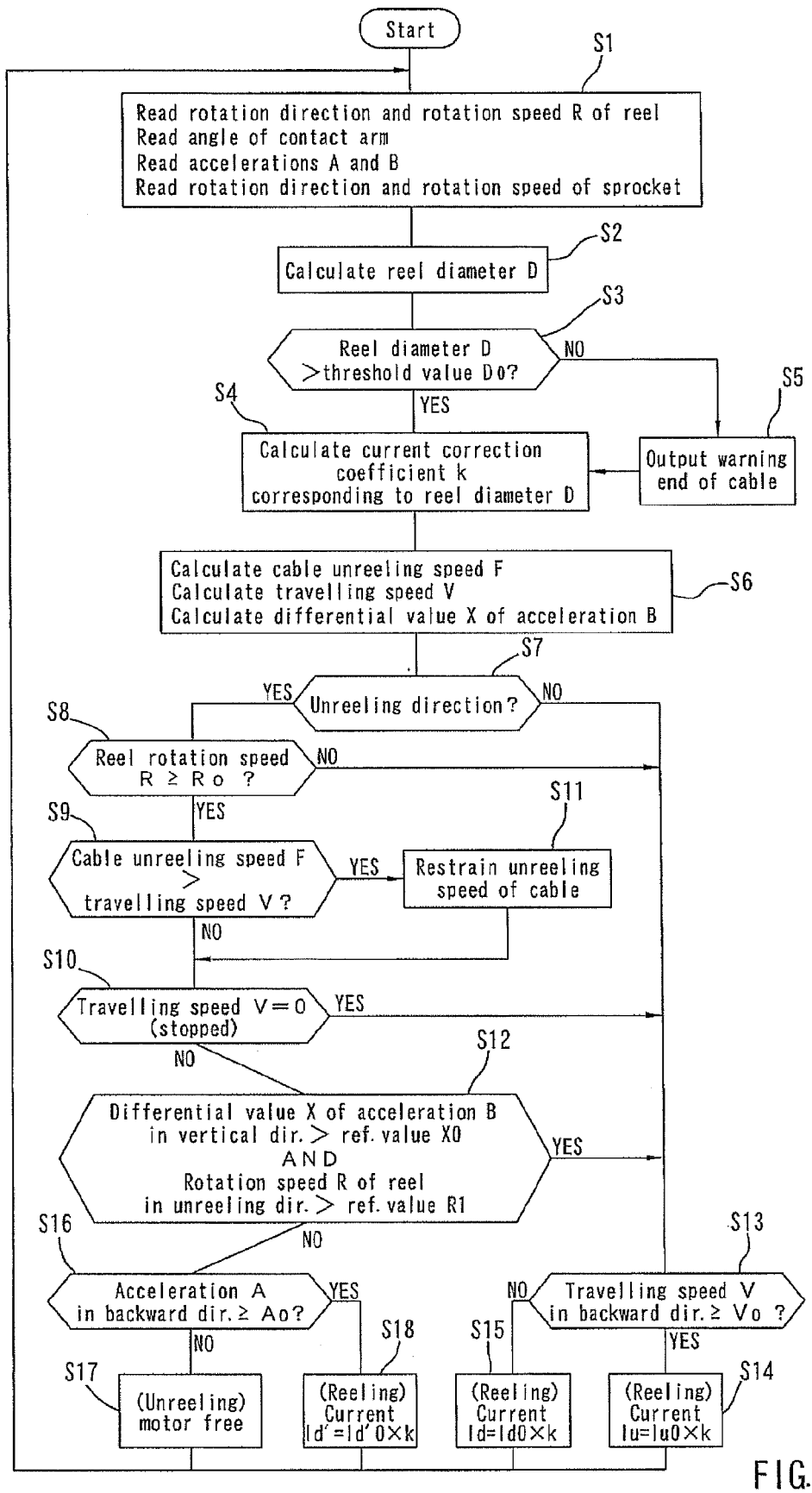
FIG. 4 is a flow chart for controlling the motor of the reel device.

The control of the motor 15 by the motor controller 40 is described hereinafter with reference to a flow chart of FIG. 4.

Firstly, in Step S1, information on the rotation direction and the rotation speed R of the reel 12 detected by the rotation sensor 16, information on angle of the contact arm 21 detected by the angle sensor 24, information on acceleration A and acceleration B detected by the acceleration sensor 50, and information on rotation direction and rotation speed of the sprocket of the crawler-type travelling body 2 detected by the rotation sensor 60 are read.

In the following Step S2, a reel diameter D (diameter of the reel 12 including the cable 3 wound around the body 12a of the reel 12) is calculated from the information on angle of the contact arm 21 detected by the angle sensor 24. The reel diameter D includes information on the amount of the cable 3 left wound around the reel 12.

In the following Step S3, a judgment is made whether the reel diameter D is greater than a threshold value D0. The threshold value D0 corresponds to the reel diameter when the amount of the cable 3 left wound around the reel 12 is slight. If a positive judgment is made in Step S3, the control then proceeds to Step S4, where a current correction coefficient k, to be described later, corresponding to the reel diameter D is calculated. In this embodiment, the current correction coefficient k is increased in proportion to the reel diameter D (i.e. in proportion to the amount of the cable left wound).

If a negative judgment is made in Step S3, the control then proceeds to Step S5, where an alarm signal is outputted, alarming that the amount of the cable left wound is approaching zero. After that, Step S4 is executed. The alarm signal is sent to the remote controller 1 via the cable 3 and alarm is displayed on the display monitor 1a or notified by voice. The operator can stop the forward movement of the crawler-type travelling body 2 in response to the alarm notification.

In the following Step S6, speed F at which the cable 3 is unreeled from the reel 12 (length of the cable 3 unreeled per unit time) is calculated from the rotation speed R of the reel 12 received from the rotation sensor 16 and the reel diameter D from the following formula:

$$F = \pi D \cdot R$$

Further in Step S6, a travelling speed V of the crawler-type travelling body 2 is calculated based on the detection information from the rotation sensor 60 and a differential value X of the acceleration B from the acceleration sensor 50 is calculated.

In the following Step S7, a judgment is made whether the rotation direction of the reel 12 is the unreeling direction or not. If a positive judgment is made (i.e. the reel 12 is judged to be rotated in the unreeling direction), basically an unreeling control by making the motor free to be described later is performed. If a negative judgment is made (i.e. the reel 12 is judged to be either rotated in the reeling direction or stopped), basically a reeling control by activating the motor 15 is performed.

The basic control mentioned above proceeds differently depending on various conditions as detailed below:

When the reel 12 is judged to be rotated in the unreeling direction in Step S7 described above, a judgment is made in Step S8 whether the rotation speed R of the reel 12 is equal to or higher than a reference rotation speed R0 or not. The reference rotation speed R0 is far lower (extremely low speed) than the rotation speed of the reel 12 during the normal forward movement of the crawler-type travelling body 2. When the crawler-type travelling body 2 is normally moving forward, a positive judgment is made in Step S8.

If a positive judgment is made in Step S8 (i.e. the reel 12 is judged to be rotated in the unreeling direction at a rotation speed equal to or higher than the reference rotation speed R0), the control then proceeds to Step S9 to basically maintain the unreeling control.

If a negative judgment is made in Step S8 (i.e. the reel 12 is judged to be rotated in the unreeling direction but at an extremely low speed), it is assumed that the cable 3 may become slack, and the reeling control to be described later is performed to prevent or remove the slack.

In Step S9, judgment is made whether an unreeling speed F of the cable 3 is higher than the forwarding speed V of the crawler-type travelling body 2. When the unreeling speed F of the cable 3 is higher than the forwarding speed V of the crawler-type travelling body 2, the cable 3 may become slack.

If a negative judgment is made in Step S9, the control then proceeds to Step S10 to basically maintain the unreeling control. If a positive judgment is made in Step S9, the control then proceeds to Step S11 to restrain the unreeling speed of the cable 3. In Step S11, the motor is not free as will be described later, but the motor drive circuit is closed and the rotation of the reel 12 in the unreeling direction is restrained by the resistance at the motor 15.

Following Step S9 or Step S11, the control then proceeds to Step 10, where a judgment is made whether the travelling speed V of crawler-type travelling body 2 is equal to zero (meaning that crawler-type travelling body 2 is stopped) or not. If the crawler-type travelling body 2 is stopped while the reel 12 is rotated in the unreeling direction, the cable 3 may become slack. If a positive judgment is made in Step S10, the control then proceeds to the reeling control to be described later to prevent or remove the slack.

If a negative judgment is made in Step S10, the control then proceeds to Step S12 to basically maintain the unreeling control.

Step S12 is provided for detecting an end of sudden change of attitude of the crawler-type travelling body 2.

Figure 5A:
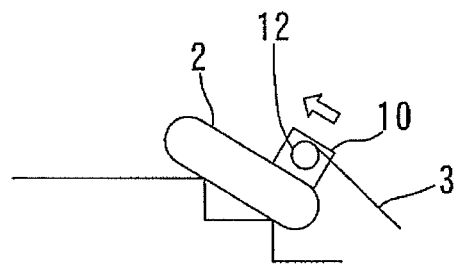
FIG. 5A is a schematic view of a crawler-type travelling body of the exploration system, showing the travelling body immediately before completing ascent of stairs when moving forward.
Figure 5B:
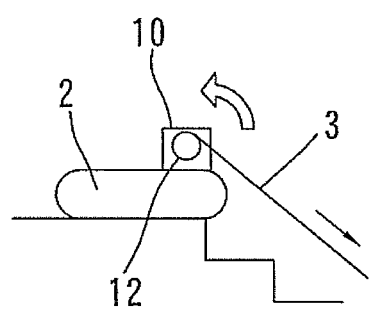
FIG. 5B is a schematic view of the crawler-type travelling body, showing the travelling body immediately after changing its attitude from an inclined attitude to a horizontal attitude after completing ascent of the stairs.

Details are described below citing an example of when the crawler-type travelling body 2 completes ascending stairs. As shown in FIG. 5A, when the crawler-type travelling body 2 is ascending stairs, the crawler-type travelling body 2 is inclined. When the crawler-type travelling body 2 completes ascending the stairs, the crawler-type travelling body 2 is rotated such that a front side of the crawler-type travelling body 2 is moved downward due to the gravity and an attitude of the crawler-type travelling body 2 is changed to the horizontal attitude shown in FIG. 5B. This sudden change of attitude of the crawler-type travelling body 2 may cause the reel 12 to be suddenly displaced upward (when the reel 12 is disposed in the rear portion of the crawler-type travelling body 2 as in this embodiment). A pulling force of the cable 3 may cause the reel 12 to be rotated in the unreeling direction in a high speed. Then the reel 12 may keep rotating due to the inertia. As a result, without an improvement such as the one provided in this embodiment, the cable 3 may become slack and the slack portion may get tangled or may spread near the reel 12 disorderly.

Step S12 is executed for preventing or removing the slack of the cable 3 as mentioned above at an early stage. In Step S12, a judgment is made whether the differential value X of the acceleration B in the vertical direction is greater than a reference value X0 or not. As mentioned above, when the crawler-type travelling body 2 completes ascending stairs or a step or bump, more specifically, at the end of the sudden change of attitude of the crawler-type travelling body 2, the crawler-type travelling body 2 may strongly hit a floor surface at an upper end of the stairs or the step or bump, and the differential value X of the acceleration B in the vertical direction is increased and exceeds the reference value X0.

In Step S12 of this embodiment, only when two conditions are met, the crawler-type travelling body 2 is judged to have ended the sudden change of attitude, wherein one condition is that the differential value X is greater than the reference value X0 and the other condition is that the rotation speed R of the reel 12 in the unreeling direction is greater than a reference value R1. This is to avoid misjudgment that may be made when the crawler-type travelling body 2 is vibrated while moving on an uneven surface. Specifically, the differential value X may become greater than the reference value X0 at a time like this, and it may be misjudged to be caused by the completion of ascent of the stairs or the step or bump. The reference value R1 is greater than the reference value R0 adopted in Step S8.

In Step S12, similar results can be obtained by comparing the unreeling speed F of the cable 3 with a reference value F1 instead of comparing the rotation speed R of the reel 12 with the reference value R1.

If a positive judgment is made in Step S12, the control then proceeds to the reeling control to be described later and the reel 12 is provided with a rotary torque in the reeling direction. Thereby, the reel 12 is restrained from being rotated at a high speed in the unreeling direction due to the inertia, and instead, the rotating direction of the reel 12 is immediately reversed to the reeling direction. As a result, the slack of the cable 3 is limited, and the slack is removed in a short period of time. Thus, an inconvenient situation such as the slack portion of the cable 3 spreading near the reel 12 can be avoided.

Figure 6A:
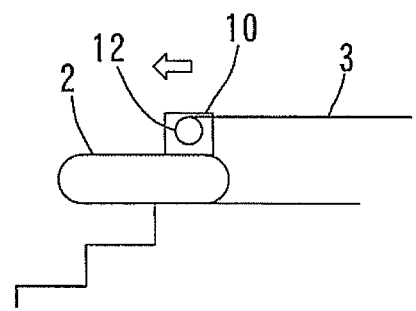
FIG. 6A is a schematic view of the crawler-type travelling body, showing the travelling body immediately before starting descent of the stairs when moving forward.
Figure 6B:
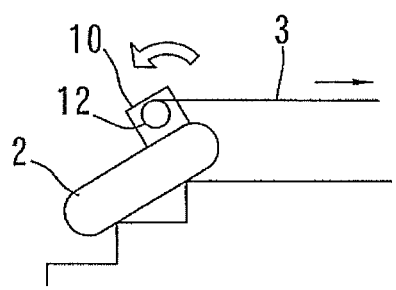
FIG. 6B is a schematic view of the crawler-type travelling body, showing the travelling body immediately after changing its attitude from the horizontal attitude to the inclined attitude after starting descent of the stairs.
Figure 7A:
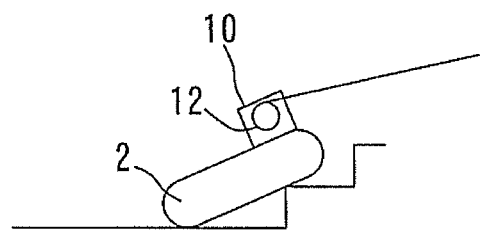
FIG. 7A is a schematic view of the crawler-type travelling body, showing the travelling body immediately before completing descent of the stairs when moving forward.
Figure 7B:
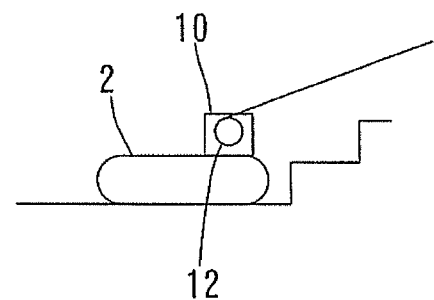
FIG. 7B is a schematic view of the crawler-type travelling body, showing the travelling body immediately after changing its attitude from the inclined attitude to the horizontal attitude after completing descent of the stairs.

The following are other modes in which the attitude of the crawler-type travelling body 2 may be changed suddenly. As shown in FIGS. 6A and 6B, when the crawler-type travelling body 2 starts descending stairs or a big step or bump while moving forward, the attitude of the crawler-type travelling body 2 changes suddenly from the horizontal attitude to an inclined attitude. Moreover, as shown in FIGS. 7A and 7B, when the crawler-type travelling body 2 completes descending stairs or a big step or bump while moving forward, the attitude of the crawler-type travelling body 2 changes suddenly from the inclined attitude to the horizontal attitude because a rear end of the crawler-type travelling body 2 falls from the last step of the stairs or the big step or bump. In such a case, as with when the crawler-type travelling body 2 completes ascending stairs, the cable 3 may be pulled strongly and the reel 12 may be rotated in the unreeling direction at a high speed. However, end of the sudden change of attitude can be detected based on the differential value X of the acceleration B in the vertical direction in Step S12, and the reel 12 can be provided with the rotary torque in the reeling direction, and the slack of the cable 3 can be removed in a short period of time.

Figure 8A:
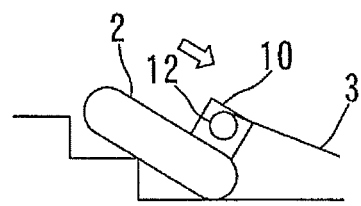
FIG. 8A is a schematic view of the crawler-type travelling body, showing the travelling body immediately before completing descent of the stairs when moving backward.
Figure 8B:
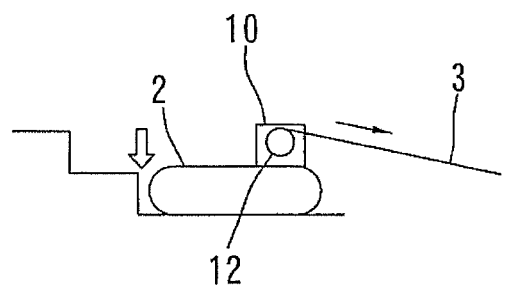
FIG. 8B is a schematic view of the crawler-type travelling body, showing the travelling body immediately after changing its attitude from the inclined attitude to the horizontal attitude after completing descent of the stairs.

During the backward movement of the crawler-type travelling body 2 as well as the forward movement of the crawler-type travelling body 2, the cable 3 may be pulled strongly accompanying a sudden change of attitude of the crawler-type travelling body 2, and the reel 12 may be rotated in the unreeling direction at a high speed. For example, as shown in FIGS. 8A and 8B, when the crawler-type travelling body 2 completes descending stairs while moving backward, the attitude of the crawler-type travelling body 2 changes suddenly from the inclined attitude to the horizontal attitude. At this time, the cable 3 is pulled, the reel 12 reverses direction of rotation from the reeling direction to the unreeling direction and is rotated in the unreeling direction at a high speed. Accordingly, as with at the sudden change of attitude while moving forward, positive judgments are made in Steps S7 and S8 and a negative judgment is made in Step S9. The control then proceeds to Step S12, and a positive judgment is made in step S12 (i.e. end of sudden change of attitude is detected). As a result, the reel 12 can be provided with a rotary torque in the reeling direction, and the slack of the cable 3 can be removed in a short period of time.

As mentioned above, the reeling control is performed when the following judgments are made:
  (a) when the reel 12 is judged to be rotated in the reeling direction or stopped in Step S7;
  (b) when the rotation speed of the reel 12 is judged to be extremely low in Step S8 even when the reel 12 is rotated in the unreeling direction;
  (c) when the crawler-type travelling body 2 is judged to be stopped in Step S10 even when the reel 12 is rotated in the unreeling direction; and
  (d) when the attitude of the crawler-type travelling body 2 is judged to be changed suddenly such as when the crawler-type travelling body 2 completes ascending, starts descending or completes descending the stairs or the step or bump in Step S12 even when the reel 12 is rotated in the unreeling direction.

The reeling control will be described in detail below. In Step S13, a judgment is made whether the travelling speed V of the crawler-type travelling body 2 in the backward direction is equal to or greater than a reference travelling speed V0. The reference travelling speed V0 is far lower (extremely low speed) than the normal travelling speed in the backward direction. Accordingly, when the crawler-type travelling body 2 is normally moving backward, a negative judgment is made in Step S7 and a positive judgment is made in Step S13, and the control then proceeds to Step S14, where duty control of supply current to the motor 15 is carried out such that the reel 12 is provided with the rotary torque in the reeling direction and a sensed current sensed at the current-sensing circuit 31 becomes a set current Iu. Thereby, the cable 3 can be reeled with a relatively large rotary torque.

If a negative judgment is made in Step S13, that is if a judgment is made that the crawler-type travelling body 2 is moving forward or moving backward at a speed lower than the reference travelling speed V0 (including zero speed), the control then proceeds to Step S15, where the motor 15 is controlled to generate the rotary torque in the reeling direction of the reel 12 and to make the sensed current sensed at the current-sensing circuit 31 a set current Id. The set current Id is smaller than the set current Iu. The rotary torque generated at Step S15 is smaller than the rotary torque generated at Step S14.

If the reeling control is to be performed based on the negative judgment in Step S7, the negative judgment in Step S8, the positive judgment in Step S10 or the positive judgment in Step S12, the reeling control is performed in Step 14 or Step 15.

If the negative judgment is made in Step S12, the control then proceeds to Step S16 to basically maintain the unreeling control. In Step S16, a judgment is made whether the acceleration A in the backward direction is equal to or greater than a reference value A0. If a negative judgment is made in Step S16, that is if the acceleration A is an acceleration in the forward direction, a zero acceleration or a an acceleration in the backward direction but smaller than the reference acceleration A0, the control then proceeds to Step S17, where the motor 15 is free (inactivated). Specifically, a part of the drive circuit connected to the coil of the motor 15 is opened, preventing the electric current from flowing into the coil even when the reel 12 is rotated. This allows the cable 3 to be unreeled smoothly.

If a positive judgment is made in Step S16, that is if the crawler-type travelling body 2 is judged to be stopped suddenly while moving forward, the unreeling control (making the motor free) of Step S17 is not performed. Instead, the control proceeds to Step S18, where the motor 15 is activated so that the sensed current becomes a set current Id', thereby providing the reel 12 with the rotary torque in the reeling direction. The set current Id' is smaller than the set current Iu of Step S14. The set current Id' may be equal to or different from the set current Id of Step S15.

In the control of motor current in Step S14, the set current Iu is determined by multiplying a fixed current value Iu0 by the current correction coefficient k. Similarly, the set current Id of Step S15 is determined by multiplying a fixed current value Id0 by the current correction coefficient k, and the set current Id' of Step S18 is determined by multiplying a fixed current value Id'0 by the current correction coefficient k. Thereby, the rotary torque can be adjusted according to a change in the amount of the cable 3 left wound (i.e. change in a weight of the reel 12 including the cable 3 wound around the reel).

The mode of control of the present invention is not limited to the embodiment described above, but various modifications can be made. For example, in the unreeling control, instead of opening the motor drive circuit in Step S17, the supply current to the motor may be made zero.

While in the embodiment described above, the end of sudden change of attitude of the travelling body is detected based on the differential value of the acceleration in the vertical direction, the end of sudden change of attitude may be detected based on the acceleration in the vertical direction.

The inclination sensor disposed in the travelling body may be used as an acceleration sensor that detects acceleration in the vertical direction. It is because information on inclination of the inclination sensor includes information on the acceleration of the travelling body in the vertical direction.

The motor controller that controls the motor of the reel device may be disposed in the base device.

The cable may include the optical fiber for transmission of signals and feeder wires. In this case, a power source for the crawler-type travelling body and the reel device may be disposed near the base device.

A distance sensor such as a laser distance meter may be used as the reel diameter detector which may detect the amount of the cable left wound around the reel from information on distance to the portion of the cable located outside in the radial direction of the reel in a non-contacting manner.

While the acceleration sensor 50 is disposed in the support 11 of the reel device 10 in the embodiment described above, there is no particular limitation to the location of the acceleration sensor 50, and the acceleration sensor 50 may be disposed in a front portion of the crawler-type travelling body.

The travelling body is not limited to the crawler-type travelling body, but may be a travelling body including a plurality of wheels.

The invention claimed is:

1. A cable system comprising:
   a cable connecting a base device and a travelling body, functions of the cable at least including transmission of signals;
   a reel device disposed on the travelling body, the reel device having a reel onto which the cable is to be wound, a motor that drives the reel and a rotation sensor that detects a rotation of the reel;
   a motor controller that controls the motor of the reel device; and
   an acceleration sensor that is disposed in the traveling body and detects an acceleration in a vertical direction;
   the motor controller opening a motor drive circuit for driving the motor or bringing a supply current to the motor to zero when it is determined that the reel is rotated in an unreeling direction for unreeling the cable based on sensed information from the rotation sensor;
   the motor controller activating the motor to provide the reel with a rotary torque in a reeling direction when it is determined that the reel is rotated in a reeling direction for reeling the cable based on the sensed information from the rotation sensor; and
   the motor controller activating the motor to provide the reel with the rotary torque in the reeling direction if a differential value of the acceleration in the vertical direction obtained from the acceleration sensor is greater than a reference value even when the reel is rotated in the unreeling direction.

2. The cable system according to claim 1, wherein when the differential value of the acceleration in the vertical direction obtained from the acceleration sensor is greater than the reference value, the motor controller activates the motor to provide the reel with the rotary torque in the reeling direction only if a rotation speed of the reel in the unreeling direction detected by the rotation sensor exceeds a reference value for the rotation speed.

3. The cable system according to claim 1,
wherein the reel device further comprises a reel diameter detector that detects a diameter of the reel with the cable wound around the reel; and
wherein the motor controller calculates an unreeling speed at which the cable is unreeled from the reel based on the diameter of the reel detected by the reel diameter detector and the rotation speed of the reel in the unreeling direction detected by the rotation sensor, and
wherein, when the differential value of the acceleration in the vertical direction obtained from the acceleration sensor is greater than the reference value, the motor controller activates the motor to provide the reel with the rotary torque in the reeling direction only if the unreeling speed of the cable exceeds a reference value for the unreeling speed.

4. The cable system according to claim 1,
wherein the reel device further comprises a reel diameter detector that detects a diameter of the reel with the cable wound around the reel; and
wherein, when the reel is rotated in the unreeling direction, the motor controller;
calculates an unreeling speed at which the cable is unreeled from the reel based on the diameter of the reel detected by the reel diameter detector and the rotation speed of the reel in the unreeling direction detected by the rotation sensor,
opens the motor drive circuit to minimize a resistance of the motor when the unreeling speed of the cable is smaller than a travelling speed of the travelling body, and
closes the motor drive circuit to restrict the rotation of the reel by the resistance of the motor when the unreeling speed of the cable is greater than the travelling speed of the travelling body.

* * * * *